Patented Feb. 23, 1954

2,670,347

UNITED STATES PATENT OFFICE 2,670,347

THIOPHOSPHORIC ACID DERIVATIVES AND METHOD OF PREPARING THE SAME

Erwin Kuh, New Brunswick, and Doris R. Seeger, Bound Brook, N. J., assignors to American Cyanamid Company, New York, N. Y., a corporation of Maine No Drawing. Application January 8, 1952, Serial No. 265,543

13 Claims. (Cl. 260—239)

This invention relates to the preparation of new organic compounds. More particularly, it relates to certain thiophosphoric acid triamides and methods for their preparation.

It is known in the prior art to prepare thiophosphoric acid triamides containing certain substituents on the nitrogen atoms (G. M. Kosolapoff; Organophosphorous Compounds 1950, pages 312–313).

The compounds of the present invention, in contrast to those of the prior art, are thiophosphoric acid ethylenimides in which at least two of the amide groups are ethylenimine radicals. These compounds may be illustrated by the following general formula:

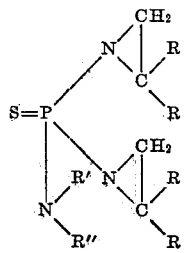

in which R represents hydrogen, aliphatic or aralkyl radicals and R' and R" represent hydrogen, aliphatic or aralkyl radicals or when taken together with the nitrogen form a saturated heterocyclic ring containing from 3 to 6 atoms, inclusive, in the ring.

The compounds of the present invention possess chemically reactive ethylenimine rings making them useful as textile chemicals; they may be polymerized to yield new plastics.

The compounds of the present invention are, in general, low melting crystalline solids to liquids. They are, in general, somewhat soluble in water and more soluble in the usual organic solvents.

In preparing the compounds of the present invention wherein the three amide groups are identical, it is desirable to react a thiophosphoryl halide with the desired ethylenimine to obtain the thiophosphoric acid triethylenimide. In preparing the compounds of the present invention wherein the amide groups are different, we prefer to carry out the process in a stepwise manner. In this process a thiophosphoryl halide is first reacted with an aliphatic, aralkyl or saturated heterocyclic secondary amine which replaces one of the halogen radicals of the thiophosphoryl halide. This intermediate compound is then reacted with two molecules of an ethylenimine to form the desired thiophosphoric acid ethylenimide. These general reactions may be illustrated by the following equations:

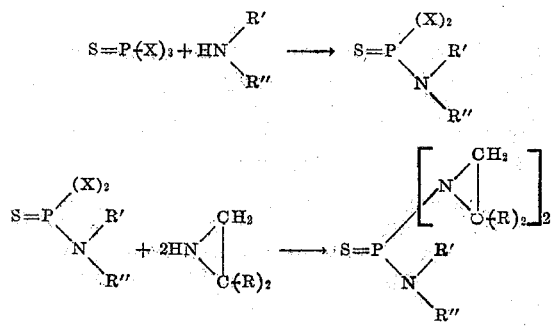

in which X is a halogen of the group consisting of chlorine and bromine and R, R' and R" are as hereinbefore defined.

In carrying out the first step of the reaction the secondary amine can be dialkylamines or diaralkylamines such as dimethylamine, diethylamine, dipropylamine, methylethylamine, ethylpropylamine, dibenzylamine, diphenethylamine, etc. Also, the secondary amine can be compounds such as ethylenimine, pyrrolidine, piperidine, morpholine, thiamorpholine, tetrahydroquinoline, 1-alkyl substituted piperazines and the like. The ethylenimines used in the preparation of the products of the present invention can be compounds such as 2-methylethylenimine, 2,2-dimethylethylenimine, 2-ethylethylenimine, 2-propylethylenimine, 2-hexylethylenimine, 2,2-diethylethylenimine, ethylenimine itself, and the like. These ethylenimine intermediates may be prepared by known procedures, such as by ring closure with an alkali metal hydroxide of the corresponding 2-haloethylamine or of the sulfuric ester of the corresponding 2-hydroxyethylamine.

The reaction to prepare the compounds of the present invention is preferably carried out in an organic solvent such as benzene, ether, dioxane, and the like. It is also necessary to have present an acid acceptor which may be a tertiary amine such as triethylamine, N-ethylmorpholine or pyridine. The reaction can also be carried out in water or in a substantially aqueous solution in which reaction acid acceptors are also required to neutralize the hydrohalide acid formed. Under these circumstances, the acid acceptor may be an alkaline substance such as alkali metal carbonate or bicarbonate. Isolation of the product from the organic solvent may be accomplished by filtration of the tertiary amine hydrochloride salt and crystallization from the organic solvent or by evaporation of the organic solvent. When the compounds are prepared in an aqueous medium some of the members may be isolated by filtration. Others may be extracted from the aqueous solution by the use of organic solvents. The procedure will vary with individual members.

The reaction is generally carried out at a temperature within the range of 0° C. to about 60° C. At this temperature range the reaction is usually complete within a period of thirty minutes to about five to six hours.

The following examples illustrate the preparation of thiophosphoric acid ethylenimides of the present invention. All parts are by weight unless otherwise indicated.

*Example 1*

A solution of 30.3 parts of triethylamine and 12.9 parts of ethylenimine in 180 parts of dry benzene is treated with a solution of 16.9 parts of thiophosphoryl chloride in 90 parts of dry benzene at 5°–10° C. Triethylamine hydrochloride is filtered off. The benzene solvent is distilled from the filtrate under reduced pressure and the resulting crude product is recrystallized from petroleum ether. The N,N′,N″-triethylenthiophosphoramide has a melting point of 51.5° C.

*Example 2*

A solution of 7.9 parts of triethylamine and 3.4 parts of ethylenimine in 27 parts of dry benzene is cooled to 5°–10° C. and treated with a solution of 8 parts of N,N-diethylamidothiophosphoryl chloride in 45 parts of dry benzene. Triethylamine hydrochloride is filtered off. The benzene solvent is distilled from the filtrate under reduced pressure and N,N-diethyl-N′,N″-diethylenethiophosphoramide as a residual oil distilled in high vacuum, boiling point 86°–87° C. at 0.8 mm. of mercury.

*Example 3*

A solution of 17.1 parts of 2-methylethylenimine and 33.3 parts of triethylamine in 135 parts of dry benzene is cooled to 10° C. and treated with a solution of 16.9 parts of thiophosphoryl chloride in 45 parts of dry benzene. Triethylamine hydrochloride is filtered off and the benzene is removed under reduced pressure. The product N,N′,N″-tris-(1-methylethylene)-thiophosphoramide, in a colorless liquid.

We claim:

1. Compounds of the group having the general formula:

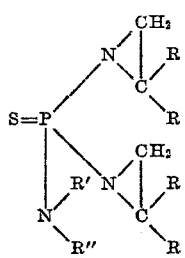

in which R is a member of the group consisting of hydrogen, and lower alkyl radicals, and R′ and R″ are members of the group consisting of hydrogen and lower alkyl radicals and when taken together with the nitrogen atom form a saturated heterocyclic radical containing from 3 to 6 atoms.

2. Compounds of the group having the general formula:

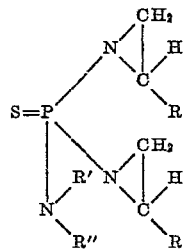

in which R is lower alkyl and NR′R″ is an ethylenimine radical containing not less than 2 and not more than 6 carbon atoms.

3. Compounds of the group having the general formula:

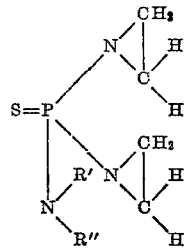

in which R′ and R″ are lower alkyl radicals.

4. Compounds having the general formula:

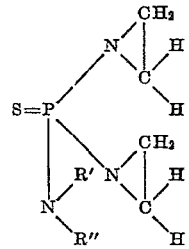

in which NR′R″ is an ethylenimine radical containing not less than 2 and not more than 6 carbon atoms.

5. N,N′,N″-triethylenthiophosphoramide.

6. N,N-diethyl-N′,N″-diethylenthiophosphoramide.

7. N,N′,N″-tris-(1-methylethylene)-thiophosphoramide.

8. A method of preparing compounds having the formula:

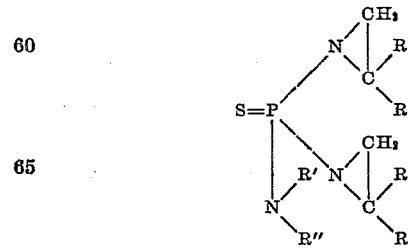

in which R is a member of the group consisting of hydrogen and lower alkyl radicals and R′ and R″ are members of the group consisting of hydrogen and lower alkyl radicals and when taken together with the nitrogen atom form a saturated heterocyclic radical containing from 3 to 6 atoms which comprises reacting a compound having the formula:

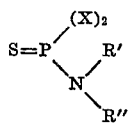

in which X is a halogen and R' and R" are as defined above with a compound having the formula:

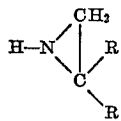

in which R is as defined above, and recovering said compound therefrom.

9. A method of preparing compounds having the formula:

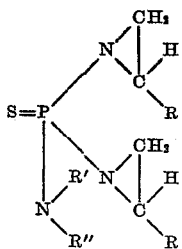

in which R is lower alkyl and NR'R" is an ethylenimine radical containing not less than 2 and not more than 6 carbon atoms which comprises reacting a compound having the formula:

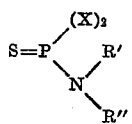

in which X is a halogen radical and R' and R" are as defined above with a compound having the formula:

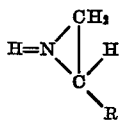

in which R is as defined above, and recovering said compound therefrom.

10. A method of preparing compounds having the formula:

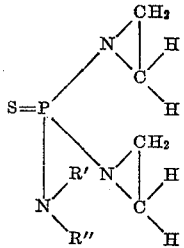

in which NR'R" is an ethylenimine radical containing not less than 2 and not more than 6 carbon atoms which comprises reacting a compound having the formula:

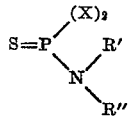

in which X is halogen and R' and R" are as defined above with an ethylenimine containing not less than 2 and not more than 6 carbon atoms and recovering said compound therefrom.

11. A method of preparing N,N',N"-triethylenthiophosphoramide which comprises reacting thiophosphoryl chloride with ethylenimine in a solvent and recovering said compound therefrom.

12. A method of preparing N,N-diethyl-N',N"-diethylenthiophosphoramide which comprises reacting N,N-diethylamidothiophosphoryl chloride with ethylenimine in a hydrocarbon solvent in the presence of a tertiary amine and recovering said compound therefrom.

13. A method of preparing N,N',N"-tris(1-methylethylene)thiophosphoramide which comprises reacting thiophosphoryl chloride with 2-methylethylenimine in a hydrocarbon solvent in the presence of a tertiary amine and recovering said compound therefrom.

ERWIN KUH.
DORIS R. SEEGER.

References Cited in the file of this patent
Michaelis, Liebig's Ann., vol. 326, p. 129 (1903).